US010899624B2

(12) United States Patent
Czajka et al.

(10) Patent No.: US 10,899,624 B2
(45) Date of Patent: Jan. 26, 2021

(54) GRAPHENE PRODUCTION PROCESS (71) Applicant: RMIT UNIVERSITY, Melbourne (AU)

(72) Inventors: Michael Czajka, Sunshine West (AU); Robert Shanks, Glen Iris (AU); Helmut Hugel, Richmond (AU)

(73) Assignee: RMIT UNIVERSITY, Melbourne (AU)

( * ) Notice: Subject to any disclaimer, the term of this patent is extended or adjusted under 35 U.S.C. 154(b) by 0 days.

(21) Appl. No.: 15/308,297

(22) PCT Filed: May 1, 2015

(86) PCT No.: PCT/AU2015/000257
§ 371 (c)(1),
(2) Date: Nov. 1, 2016

(87) PCT Pub. No.: WO2015/164916
PCT Pub. Date: Nov. 5, 2015

(65) Prior Publication Data
US 2017/0050854 A1 Feb. 23, 2017

(30) Foreign Application Priority Data
May 1, 2014 (AU) .................................. 2014901584

(51) Int. Cl.
*C01B 32/22* (2017.01)
*C01B 32/225* (2017.01)
*C01B 32/192* (2017.01)
*C01B 32/184* (2017.01)
*C01B 32/19* (2017.01)
*C01B 32/182* (2017.01)

(52) U.S. Cl.
CPC ............ *C01B 32/22* (2017.08); *C01B 32/182* (2017.08); *C01B 32/184* (2017.08); *C01B 32/19* (2017.08); *C01B 32/192* (2017.08); *C01B 32/225* (2017.08); *C01B 2204/20* (2013.01)

(58) Field of Classification Search
CPC ... C01B 31/0446; C01B 32/22; C01B 32/192; C01B 32/182; C01B 32/184; C01B 32/19; C01B 32/225; C01B 2204/20
See application file for complete search history.

(56) References Cited

U.S. PATENT DOCUMENTS

| 6,406,612 | B1 | 6/2002 | Greinke | |
|---|---|---|---|---|
| 2002/0168314 | A1 | 11/2002 | Roemmler | |
| 2005/0271574 | A1* | 12/2005 | Jang | B82Y 30/00 423/448 |
| 2007/0092432 | A1* | 4/2007 | Prud'Homme | B82Y 30/00 423/448 |
| 2008/0048152 | A1 | 2/2008 | Jang et al. | |
| 2008/0279756 | A1 | 11/2008 | Zhamu et al. | |
| 2010/0096595 | A1* | 4/2010 | Prud'Homme | B82Y 30/00 252/500 |
| 2011/0012067 | A1 | 1/2011 | Kay | |
| 2013/0156678 | A1* | 6/2013 | Banerjee | B82Y 30/00 423/445 R |

FOREIGN PATENT DOCUMENTS

| CN | 101179921 A | 5/2008 |
|---|---|---|
| CN | 102730667 A | 10/2012 |
| WO | 2008/060703 A2 | 5/2008 |
| WO | 2009/049375 A1 | 4/2009 |

OTHER PUBLICATIONS

Ciesielski, et al., Graphene via sonication assisted liquid-phase exfoliation, Chem. Soc. Rev. 2014; 43: 381.*
Sun, et al., Highly Concentrated Aqueous Dispersions of Graphene Exfoliated by Sodium Taurodeoxycholate: Dispersion Behavior and Potential Application as a Catalyst Support for the Oxygen-Reduction Reaction, Chem. Eur. J. 2012; 18: 6972-6978.*
Rozada, et al, Towards full repair of defects in reduced graphene oxide films by two-step graphitization, Nano Research 2013; 6(3): 216-233.*
Narayanan, et al., Carbon monoxide-induced reduction and healing of graphene oxide, J. Vac. Sci. Technol. A 31, 040601 (2013), pp. 1 to 8 (Year: 2013).*
Bianco, et al., Editorial All in the graphene family—A recommended nomenclature for two-dimensional carbon materials, Carbon 2013; 65: 1-6 (Year: 2013).*
Klintenberg, et al., Evolving properties of two-dimensional materials: from graphene to graphite, J. Phys.: Condens. Matter 2009; 21 : 335502, pp. 1-7 (Year: 2009).*
International Search Report and Written Opinion for corresponding Application No. PCT/AU2015/000257 (dated Jul. 1, 2015).
Focke et al., "Characterization of Commercial Expandable Graphite Fire Retardants," Thermochimica Acta 584:8-16 (2014).
Ramakrishnan et al., "Synthesis and Characterization of Reduced Graphene Oxide," Adv. Mat. Res. 678:56-60 (2013).
Liu et al., "Electric Field Effects on the Adsorption of CO on a Graphene Nanodot and the Healing Mechanism of a Vacancy in a Graphene Nanodot," J. Phys. Chem. C 116:3034-3041 (2012).
Sanyal et al., "Molecular Adsorption in Graphene with Divacancy Defects," Phys. Rev. B: Condensed Matt. Mat. Physics 79(11):113409/1-113409/4 (2009).

(Continued)

*Primary Examiner* — Daniel C. McCracken
(74) *Attorney, Agent, or Firm* — Troutman Pepper Hamilton Sanders LLP (Rochester)

(57) ABSTRACT

A process for the preparation of reduced graphene comprising the steps of: providing an expandable graphite intercalated with oxygen containing groups; heating the expandable graphite under conditions sufficient to cause expansion of the expandable graphite and formation of an expanded graphite comprising oxygen containing groups; and contacting the expanded graphite with carbon monoxide to reduce at least a portion of the oxygen containing groups and form a reduced expanded graphite comprising an array of reduced graphene. The process of the invention enables large volumes of high quality graphene to be produced.

19 Claims, 4 Drawing Sheets

(56) References Cited

OTHER PUBLICATIONS

Zaldivar et al., "Surface Functionalization of Graphenelike Materials by Carbon Monoxide Atmospheric Plasma Treatment for Improved Wetting without Structural Degradation," J. Vac. Sci. Technol. B 30(3):03D107-1-03D107-7 (2012).
Narayanan et al., "Carbon Monoxide-Induced Reduction and Healing of Graphene Oxide," J. Vac. Sci. Technol. 31(4):040601-1-040601-8 (2013).
Dreyer et al., "The Chemistry of Graphene Oxide," Chem. Soc. Rev. 39:228-240 (2010).
Cancado et al., "Quantifying Defects in Graphene via Raman Spectroscopy at Different Excitation Energies," Nano Lett. 11(8):3190-6 (2011).
Hong et al., "Sulfuric Acid Intercalated Graphite Oxide for Graphene Preparation," Sci. Rep. 3:3439 (2013).
Supplementary European Search Report for EP15786490 dated Oct. 25, 2017.

\* cited by examiner

GRAPHENE PRODUCTION PROCESS

This application is a national stage application under 35 U.S.C. § 371 of PCT Application No. PCT/AU2015/000257, filed May 1, 2015, which claims priority of Australia Patent Application No. 2014901584, filed May 1, 2014.

FIELD

The invention relates to generally a process for the production of graphene. In particular, the invention relates a process for the preparation of reduced graphene of high quality. The invention also relates to reduced graphene prepared by the process and products containing the reduced graphene.

BACKGROUND

Graphene is a material in the form of a two-dimensional, one-atom thick sheet of carbon atoms arranged in a hexagonal honeycomb crystal lattice pattern. Graphene is increasingly of interest for use in a number of applications, such as in flexible electronics, semiconductors and as strengthening agents in advanced materials, as graphene possesses a number of unique and desirable properties, including being transparent, strong, light, and an excellent conductor of heat and electricity.

Currently, a number of methods can be used for the production of graphene, including for example, micro-mechanical exfoliation of graphite, SiC thermal decomposition, chemical vapor deposition (CVD) and epitaxial growth, each of which have various advantages and disadvantages. For example, "bottom up" methods of graphene production such as CVD are time consuming and expensive and produce only small volumes of single-layer or few-layer graphene. As a result, such methods are unsuitable for generating large quantities of graphene and are unlikely to be viable on a commercial scale. In addition, "top down" methods of graphene production, such as chemical oxidation, can result in graphene that contains a significant proportion of oxide groups and defects, which can have detrimental effects on the electronic, optical and mechanical properties of the graphene. Top down production methods may also be slow, costly and dangerous.

There remains a need for a production process that is capable of producing large volumes of high quality graphene.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY

In accordance with one aspect of the invention there is provided a process for the preparation of reduced graphene comprising the steps of:

providing an expandable graphite intercalated with oxygen containing groups;

heating the expandable graphite under conditions sufficient to cause expansion of the expandable graphite and formation of an expanded graphite comprising oxygen containing groups; and contacting the expanded graphite with carbon monoxide to reduce at least a portion of the oxygen containing groups and form a reduced expanded graphite comprising an array of reduced graphene.

In one set of embodiments, the expanded graphite is heated during contact with the carbon monoxide. In some embodiments, the expanded graphite is heated at a temperature of at least 80° C. during contact with the carbon monoxide. In some exemplary embodiments, the expanded graphite is heated at a temperature in the range of from about 80 to 1800° C., preferably in the range of from about 500 to 1000° C., more preferably in the range of from about 800 to 900° C., during contact with the carbon monoxide.

In embodiments of the invention, the expanded graphite may be contacted with carbon monoxide for a time period of at least 1 minute. In some embodiments, the expanded graphite may be contacted with carbon monoxide for a time period of at least 30 minutes. In one form, the expanded graphite may be contacted with carbon monoxide for a time period in the range of from 1 to 24 hours, or in the range of from about 6 to 12 hours.

To reduce the oxygen containing groups, the expanded graphite may be contacted with a gas comprising from about 1% to 100% carbon monoxide, more preferably at least 5% carbon monoxide such as 5% to 50% carbon monoxide. In some embodiments, the expanded graphite may be contacted with a gas comprising carbon monoxide in admixture with an inert gas, such as argon or nitrogen.

In accordance with one set of embodiments of the process of the invention, the expandable graphite intercalated with oxygen containing groups may be heated at a temperature of at least 150° C. In some preferred embodiments the expandable graphite intercalated with oxygen containing groups may be heated at a temperature in the range of from about 200 to about 1800° C., more preferably at a temperature in the range of from about 500 to 1200° C. and most preferably at a temperature of in the range of from about 700 to 1100° C.

The expandable graphite intercalated with oxygen containing groups may be heated for a time period in the range of from about 0.1 seconds to 2 minutes. The heat applied to the expandable graphite may cause rapid thermal expansion of the expandable graphite, such that the heat only needs to be applied for a relatively short time.

In one set of embodiments the expandable graphite is heated in a gas atmosphere such as air or an inert gas such as nitrogen, argon or the like. In a further embodiment the expandable graphite is heated in a carbon monoxide atmosphere. The heating may take place in a furnace with a flow of the gas and may take place under reduced pressure. In one set of embodiments the heating of expandable graphite occurs in an atmosphere of a gas other than carbon monoxide and the expanded graphite is then reduced by heating in an atmosphere of carbon monoxide In one set of embodiments the expandable graphite intercalated with oxygen containing groups is irradiated during heating.

In one set of embodiments the expandable graphite intercalated with oxygen containing groups is heated under reduced pressure.

In one form, the process of the invention may be a single step process in which heating of the expandable graphite intercalated with oxygen containing groups is carried out in the presence of carbon monoxide, whereby the expansion of the expandable graphite and reduction of at least a portion of the oxygen containing groups by the carbon monoxide to form reduced expanded graphite may occur in a single vessel such as a furnace. In this process the reduction of at least a portion of the oxygen containing groups is continuous with the expansion process so that the gas composition need not be changed.

Accordingly in one set of embodiments there is provided a process for the preparation of reduced graphene comprising the steps of:

providing an expandable graphite intercalated with oxygen containing groups;

heating the expandable graphite in the presence of carbon monoxide under conditions sufficient to cause expansion of the expandable graphite and formation of an expanded graphite wherein the carbon monoxide reduces at least a portion of the oxygen containing groups to form a reduced expanded graphite comprising an array of reduced graphene.

In some embodiments, the process of the invention may also comprise the step of subjecting the reduced expanded graphite to conditions sufficient to exfoliate the reduced expanded graphite and thereby form separated layers of reduced graphene In one set of embodiments the reduced expanded graphite is subjected to mechanical exfoliation. Mechanical exfoliation may be achieved by sonication, preferably ultrasonication.

In some embodiments of the process, the reduced expanded graphite is sonicated at a frequency of at least 20 kHz, preferably at a frequency in the range of from about 20 to 100 kHz.

In some embodiments the reduced expanded graphite may be dispersed in a carrier and exfoliated in the carrier. The carrier may be a solid or liquid carrier, preferably a liquid carrier such as a solvent. Preferably, the solvent is an aromatic hydrocarbon solvent, more preferably a non-polar aromatic hydrocarbon solvent.

In another aspect, the present invention also provides reduced graphene prepared by the process of any one of the embodiments described herein.

BRIEF DESCRIPTION OF THE DRAWINGS

Preferred embodiments of the invention will herein be illustrated by way of example only with reference to the accompanying drawings in which.

DETAILED DESCRIPTION

The present invention provides a process for the production of graphene, in particular, reduced graphene. The process of the invention allows high quality graphene to be produced from relatively low cost and readily available sources of graphite.

In accordance with one aspect there is provided a process for the preparation of reduced graphene comprising the steps of:

providing an expandable graphite intercalated with oxygen containing groups;

heating the expandable graphite under conditions sufficient to cause expansion of the expandable graphite and formation of an expanded graphite comprising oxygen containing groups; and contacting the expanded graphite with carbon monoxide to reduce at least a portion of the oxygen containing groups and form a reduced expanded graphite comprising an array of reduced graphene.

The process of the invention employs an expandable graphite. The expandable graphite is a carbon material composed of a multi-layered stack of graphene. Each graphene layer is formed from a planar array of carbon atoms arranged in a two-dimensional hexagonal lattice pattern. Each lattice layer in the graphite is therefore composed of graphene.

The expandable graphite employed in the process of the invention is intercalated with oxygen containing groups.

As used herein, a reference to a group being "intercalated" is generally a reference to the group (such as for example, an atom, ion, molecule or compound) being trapped between lattice layers of the expandable graphite. Intercalated groups predominately interact with the lattice layers via non-covalent bonding interactions.

As used herein, a reference to "oxygen containing groups" is generally a reference to groups such as epoxides, hydroxyls, ketones, ketone pairs, phenols, carboxyls, cyclic ethers and the like, which may be a result of oxidation reactions. The intercalated oxygen containing groups may be dispersed throughout the expandable graphite structure, as well as be located at the edges of the lattice layers of the expandable graphite.

Expandable graphites that are intercalated with oxygen containing groups are available commercially and the process of the invention may employ any suitable commercial expandable graphite. Commercial expandable graphites can be sourced from suppliers such as Graftech and Asbury Carbons. Some examples are Graftech 220-50N, Graftech 160-80N and Graftech 220-80N expandable graphite, and Asbury 1721 expandable graphite. The process of the invention may also employ expandable graphite that has been synthesised by treating graphite under chemical oxidation conditions with an oxidising agent.

In accordance with the invention, the process comprises the step of heating the expandable graphite. Heating of the expandable graphite results in the layers in the expandable graphite starting to separate and become spaced apart from one another and thereby results in the formation of an expanded graphite comprising oxygen containing groups.

Thus in accordance with the invention, the expandable graphite undergoes a thermal expansion to form an expanded graphite.

The expandable graphite intercalated with oxygen containing groups may be heated at a temperature sufficient to cause expansion of the material, leading to an increase in the volume of the material when heated. A wide range of temperatures may be employed and the choice of temperature may in some embodiments may be selected having regard to the onset temperature of the expandable graphite, as well as practical considerations, such as for example, the practical range of temperatures that can be achieved with the apparatus used to heat the expandable graphite. In one set of embodiments, the expandable graphite is heated at a temperature of at least 150° C. In some embodiments, the expandable graphite is heated at a temperature in the range of from about 200 to about 1800° C., preferably in the range of from about 400 to 1600° C., more preferably in the range of from about 500 to 1200° C., and most preferably in the range of from about 700 to 1100° C.

Heating of the expandable graphite may be performed by induction heating, radiant heating, laser heating, infrared (IR) heating, microwave heating, plasma heating, ultraviolet (UV) heating, surface plasmon heating, or the like, or a combination of any one of the aforementioned heating methods. The heat source may be attached to a chamber to increase the temperature in the chamber to a selected temperature.

In one set of embodiments, heating of the expandable graphite is performed by placing the expandable graphite in a furnace or oven that is set at, or is heated to, a desired temperature.

The expandable graphite intercalated with oxygen containing groups may be heated for a time sufficient to cause expansion of the material and the formation of an expanded graphite. Theoretically, any suitable time period may be used and the desired time period may depend on variables such as the temperature at which the expandable graphite is heated and the apparatus employed to apply the heat. For example, less time may be required if the expandable graphite is heated at a high temperature. In a practical sense, the expandable graphite may be heated for a time period that ranges from fractions of a second to minutes, although longer time periods may be employed if desired. In one set of embodiments, it may be desirable to heat the expandable graphite for a time period in the range of from about 0.1 second to 2 minutes.

It is an advantage of the invention that the expandable graphite undergoes rapid expansion under thermal conditions to form an expanded graphite comprising oxygen containing groups. The intercalated oxygen containing groups of the expandable graphite may assist with the rapid thermal expansion. Without wishing to be limited by theory, it is thought that a portion of the intercalated oxygen containing groups decompose when heat is applied, leading to the formation of gaseous decomposition products that promote the expansion of the graphite perpendicularly to the plane of the lattice layers.

In one embodiment, the expandable graphite intercalated with oxygen containing groups may be subjected to further treatment during heating in order to increase the efficiency of the expansion and/or to allow lower temperatures or faster times to be employed. In some embodiments, the further treatment may be selected from the group consisting of irradiation, reduced pressure, and combinations thereof.

In one set of embodiments, the expandable graphite intercalated with oxygen containing groups may be irradiated during heating. The expandable graphite may be irradiated by exposing the expandable material to light emitted from a suitable source, such as for example, a flash gun (e.g. a xenon flash gun) or laser, ultrasonics, microwave or source of high energy radiation. In such embodiments, the expandable graphite may absorb energy from the emitted light in addition to the thermal energy from heating and in this manner the thermal expansion of the expandable graphite may proceed at higher temperatures and/or faster rates or otherwise be enhanced.

In one set of embodiments, the expandable graphite intercalated with oxygen containing groups is heated under reduced pressure. In such embodiments, the expandable graphite may be heated while a negative pressure (i.e. vacuum) is applied. The application of vacuum may enable thermal expansion of the expandable graphite to be achieved at lower temperatures. In one set of embodiments, the expandable graphite intercalated with oxygen containing groups is heated while vacuum is applied to reduce the pressure to a value that is less than the atmospheric pressure of 760 mm Hg. In one set of embodiments, the, the expandable graphite intercalated with oxygen containing groups is heated while at a pressure in a range selected from the group consisting of from about 0.01 to 100 mm Hg, 0.05 to 50 mm Hg, 0.1 to 20 mm Hg and 0.2 to 10 mm Hg.

In one set of embodiments, a combination of reduced pressure and irradiation may be used. For instance, the expandable graphite intercalated with oxygen containing groups may be placed in a reduced pressure atmosphere and heated in the reduced atmosphere while also being irradiated during the heating step.

In one set of embodiments, it may be desirable to heat the expandable graphite at higher temperatures (e.g. at least 700° C.) as thermal expansion of the expandable graphite at such temperatures may advantageously result in thermal desorption of a portion of the oxygen containing groups.

The expanded graphite that is produced from heating of the expandable graphite is also a multi-layer material, however due to the thermal treatment of the expandable graphite, the multiple layers of the expanded graphite are spaced further apart from one another, resulting in a greater interlayer distance, which may eventually facilitate easier separation of the layers. The expanded graphite may also be considered to be a multi-layer assembly of graphene.

The expanded graphite produced from the thermal expansion of the expandable graphite comprises oxygen containing groups. As some intercalated oxygen containing groups may decompose and/or desorb during heating of the expandable graphite, the expanded graphite may comprise fewer oxygen containing groups than the expandable graphite material. The oxygen containing groups present in the expandable graphite are generally covalently bound to a layer of the expanded graphite and may be on the surface and/or at the edge of a layer. The oxygen containing groups may be epoxides, hydroxyls, ketones, ketone pairs, phenols, carboxyls, cyclic ethers and the like, as described herein.

The expanded graphite produced from the thermal expansion may also comprise areas of defect in addition to oxygen containing groups. A defect is considered to be present in a layer of the expanded graphite material if the regular carbon lattice network of the layer contains a structure that disrupts the symmetry of the lattice. Defects may be caused by edges, grain boundaries, vacancies, implanted atoms and changes from $sp^2$ to $sp^3$ carbon bonding, and may occur at any position in a layer of the expanded graphite material.

In accordance with the process of the invention, the expanded graphite comprising oxygen containing groups is contacted with carbon monoxide. Upon contact with the expanded graphite, the carbon monoxide reduces at least a portion of the oxygen containing groups present on the expanded graphite. Thus the reaction of carbon monoxide with an oxygen containing group present in a layer of the expanded graphite results in removal the oxygen containing group from the layer. Reduction of the oxygen containing group may proceed by a variety of mechanisms, depending on the nature of the oxygen containing group. Without wishing to be limited by theory, it is believed that the carbon monoxide may act as a nucleophilic agent and interact with oxygen containing groups on the expanded graphite in a manner that results in displacement of the oxygen containing group in the gas phase.

In one set of embodiments, contacting the expanded graphite comprising oxygen containing groups with carbon monoxide reduces at least 10%, at least 20%, at least 30%, at least 40%, at least 50%, at least 60%, at least 70%, at least 80% or least 90% of the oxygen containing groups present in the expanded graphite.

The inventors have found that the use of carbon monoxide as a reducing agent can be advantageous as carbon monoxide can be more effective in removing oxygen containing groups, compared to other reducing agents described in the prior art. Furthermore, the inventors have found that carbon monoxide may also be advantageous in repairing defects that may be present in one or more layers of the expanded graphite. Without wishing to be bound by theory, it is thought that defect repair may occur as carbon monoxide has an ability to donate carbon to the carbon lattice network. This advantage may not be possible with other reducing agents that are not capable of donating carbon to the carbon network.

In one set of embodiments, the expanded graphite is heated during contact with the carbon monoxide. Heating of the expanded graphite during its contact with carbon monoxide may be desirable in some instances to promote reduction of the oxygen containing groups by the carbon monoxide as the reduction may be enhanced at elevated temperatures. Without wishing to be bound by theory, it is thought that oxygen containing groups may be less stable at elevated temperature and thus more susceptible to reduction and removal.

Heating of the expanded graphite comprising oxygen groups may occur at a suitable temperature. In some embodiments the expanded graphite is heated at a temperature of at least 80° C. during contact with the carbon monoxide. Theoretically there is no upper limit to the temperature that may be employed and there may be some advantages to high temperature expansion for the mass production of reduced graphene on a commercial scale (e.g. expansion would proceed much more rapidly). However, considerations such as the temperature range of the apparatus used to apply the heat and the melting point of carbon (approximately 4700° C.) may impose some practical limitations. In one set of embodiments, the expanded graphite may be heated at a temperature in a range selected from the group consisting of about 80 to 1800° C., about 500 to 1000° C., and about 700 to 900° C., during contact with the carbon monoxide.

Heating of the expanded graphite comprising oxygen groups during its contact with carbon monoxide may be performed by induction heating, radiant heating, laser heating, infrared (IR) heating, microwave heating, plasma heating, ultraviolet (UV) heating, surface plasmon heating, and the like, or any combination thereof.

In some embodiments, the expanded graphite may be placed in a chamber that is set at, or is heated to, a desired temperature. The chamber will also be suitable for containing an atmosphere comprising carbon monoxide. In one set of embodiments, the expanded graphite may be heated in a ceramic tube furnace containing a reducing atmosphere comprising carbon monoxide.

The expanded graphite comprising oxygen groups may be contacted with carbon monoxide for a time sufficient to reduce at least a portion of the oxygen containing groups. It will be appreciated that the contact time may vary, depending for example, on the portion of oxygen containing groups desired to be reduced, the carbon monoxide content of the reducing atmosphere and optionally, the extent to which defects in the expanded graphite are also to be repaired.

In one set of embodiments, the expanded graphite is contacted with carbon monoxide for a time period of at least 1 minute, preferably a time period of at least 30 minutes. In specific forms of the process, the expanded graphite is contacted with carbon monoxide for a time period in the range of from about 1 to 24 hours, from about 4 to 16 hours, from about 6 to 12 hours, or from about 8 to 10 hours.

In order to contact the expanded graphite with carbon monoxide, the expanded graphite may be exposed to a reducing atmosphere comprising carbon monoxide. The reducing atmosphere may be provided by a gas comprising carbon monoxide. Thus in one embodiment of the process of the invention the expanded graphite may be contacted with a gas comprising carbon monoxide. The gas may comprise from 1% to 100% carbon monoxide. In some embodiments the gas may comprise carbon monoxide in admixture with an inert gas, such as argon or nitrogen. In one set of embodiments, the gas may comprise at least 5%, at least 10%, at least 20%, at least 50%, or at least 70% carbon monoxide in admixture with an inert gas. Alternatively, a gas comprising 100% carbon monoxide may be used. A skilled person would appreciate that the use of a gas with higher carbon monoxide content may allow the reduction of the oxygen containing groups to proceed for less time or at a faster rate.

A reducing atmosphere comprising carbon monoxide may be formed by flowing a gas comprising carbon monoxide into the interior space of a chamber or vessel. The gas flow rate may be adjusted to enable effective reduction of oxygen containing groups on the expanded graphite to be achieved with a desired contact time for a specified quantity of expanded graphite. A skilled person would appreciate that a larger quantity of expanded graphite, the presence of greater quantities of oxygen containing groups and/or a desire for shorter carbon monoxide contact times may favour the use of higher gas flow rates. In one set of embodiments, a gas comprising carbon monoxide may be flowed into a chamber or vessel at a flow rate in a range selected from the group consisting of from about 50 to 500 mL/min, 75 to 400 mL/min and 100 to 300 mL/min.

The expanded graphite comprising oxygen containing groups may be contained in a vessel and exposed to a reducing atmosphere comprising carbon monoxide. In some embodiments it may be desirable to tumble or stir the expanded graphite so as to expose a greater surface area of the expanded graphite to the carbon monoxide in the atmosphere.

In one form of the process of the invention, the expanded graphite may be contacted with carbon monoxide while being heated at a temperature between about 80 to 1800° C., preferably at a temperature between a bout 500 to 1000° C., for a time of between 1 to 24 hours, preferably between 4 to 16 hours. In one specific embodiment, the expanded graphite may be contacted with carbon monoxide while being heated at a temperature in the range of from about 700 to 900° C., for a time period of about 8 to 10 hours.

When the expanded graphite is heated during its contact with carbon monoxide, the time in which the expanded graphite is exposed to the carbon monoxide may be reduced in some embodiments.

Once the expandable graphite has been contacted with carbon monoxide for a desired period of time, reduced expanded graphite is formed. The reduced expanded graphite produced in accordance with the process of the invention comprises fewer oxygen containing groups than that of the expanded graphite prior its contact with the carbon monoxide.

In one set of embodiments, the quantity of oxygen containing groups present in the reduced expanded graphite is no more than about 2%, preferably no more than about 1.5%, more preferably no more than about 1% and most preferably no more than 0.5%. The occurrence of oxygen containing groups may be assessed by techniques such as thermogravimetric analysis (TGA).

Thermal expansion of the expandable graphite to form an expanded graphite and treatment of the expanded graphite with carbon monoxide may be carried out in a staged manner or in a single step.

In one set of embodiments, the thermal expansion step and the carbon monoxide treatment step may be carried in a staged manner, such that the expansion and carbon monoxide treatment steps are performed as separate and distinct steps of the process. For example, thermal expansion of the expandable graphite may be carried out in a first step, and subsequently, the expanded graphite resulting from the thermal expansion step is then contacted with carbon monoxide in a second step. In such embodiments, the expanded graphite formed after the thermal expansion step may optionally be stored for a period of time prior to being contacted with carbon monoxide in the reduction step.

The thermal expansion step and the carbon monoxide treatment step of the process of the invention may be carried out in separate chambers or vessels. Alternatively, the two steps may be performed in a single chamber or vessel in which the temperature and atmosphere in the chamber or vessel may be independently controlled.

In another set of embodiments, the thermal expansion step and carbon monoxide reduction step may be performed as a one-step procedure in a single vessel. In such embodiments, heating of the expandable graphite intercalated with oxygen containing groups may be carried out in a reducing atmosphere comprising carbon monoxide. Accordingly, thermal expansion of the expandable graphite to form an expanded graphite and the reduction of oxygen containing groups by the carbon monoxide may occur together, within the same chamber or vessel. The ability to perform the thermal expansion and carbon monoxide treatment steps in a single chamber or vessel enables reduced expanded graphite to be formed in a single step process. It may further decrease the potential for undesirable oxides to be formed.

In one form of the process of the invention, an expandable graphite intercalated with oxygen containing groups may be heated in the presence of carbon monoxide to thereby form reduced expanded graphite in a single step. The expandable graphite may be heated at a temperature in a range selected from the group consisting of from about 200 to 1800° C., about 400 to 1600° C., about 500 to 1200° C., about 700 to 1100° C. and about 800 to 900° C., while in contact with the carbon monoxide.

The resulting expanded graphite may be maintained in the carbon monoxide for a further of period time. The expanded graphite may also be heated during this time to maintain the expanded graphite at an elevated temperature. In one set of embodiments, the expanded graphite is heated at a temperature in a range selected from the group consisting of from about 80 to 1600° C., about 500 to 1000° C., about 700 to 900° C., and about 800° C., while being maintained in a reducing atmosphere comprising carbon monoxide.

The expanded graphite may be maintained in the reducing atmosphere for a time period in a range selected from the group consisting of about 1 to 24 hours, about 4 to 16 hours, about 6 to 12 hours, and about 8 to 10 hours.

In one particular embodiment, the expanded graphite is maintained in a reducing atmosphere comprising carbon monoxide at a temperature in a range of from about 700 to 900° C. for about 8 to 10 hours.

In one set of embodiments of the single step procedure, the expandable graphite intercalated with oxygen containing groups may be heated at a first temperature while in the presence of carbon monoxide, to form the expanded graphite. The resulting expanded graphite may then be maintained in the presence of the carbon monoxide at a second temperature. In this manner, the temperature employed may vary during the single step procedure. It may be useful to vary the temperature in order to optimise the procedure. For example, graphite expansion may proceed more efficiently at a first temperature, while the treatment of the expanded graphite with carbon monoxide to remove oxygen containing groups and facilitate defect repair may be more efficient at a second temperature.

When the temperature varies during the single step procedure, the expandable graphite intercalated with oxygen containing groups may be heated at a first temperature in a range selected from the group consisting of from about 200 to 1800° C., about 400 to 1600° C., about 500 to 1200° C. while in the presence of carbon monoxide. Preferably, the first temperature is about 1100° C.

Following expansion of the graphite, the resulting expanded graphite may then be maintained in the carbon monoxide atmosphere for a period of time at a second temperature. The second temperature is preferably lower than that of the first temperature. In some embodiments, the second temperature may be in a range selected from the group consisting of 500 to 1000° C. and about 700 to 900° C. Preferably, the second temperature is about 800° C. The expanded graphite may be maintained at the second temperature and in the presence of the carbon monoxide for a time period in a range selected from the group consisting of about 1 to 24 hours, about 4 to 16 hours, about 6 to 12 hours, and about 8 to 10 hours.

One advantage of the single step procedure is that efficient removal of oxygen containing groups may occur while defect forming mechanisms are also suppressed due to the carbon monoxide containing atmosphere. This may, in turn, facilitate the formation of high electronic quality graphene.

In another aspect, the present invention also provides reduced expanded graphite prepared by a process of any one of the embodiments described herein.

The reduced expanded graphite prepared in accordance with the invention retains a structure in which a plurality of carbon lattice layers is arranged in a multi-layer array. Oxygen containing groups that had been present on the layers are now reduced by the carbon monoxide so that reduced carbon layers are formed. Thus in comparison to the expanded graphite material obtained following the thermal expansion step, the reduced graphite material obtained after contacting the carbon monoxide comprises fewer oxygen containing groups and may further comprise fewer defects. The skilled addressee will appreciate that each of the carbon layers present in the reduced expanded graphite may be regarded as a layer of reduced graphene. Thus the reduced expanded graphite produced in the process of the invention comprises a multi-layer array of reduced graphene.

Reduced expanded graphite obtained by heating of expanded graphite comprising oxygen containing groups in the presence of carbon monoxide may be cooled prior to use, further processing or storage. Cooling may be performed at a rate of between about 0.1° C./minute to about 10° C./minute, or about 0.5° C./minute to about 5° C./minute, or about 1° C./minute to 4° C./minute, or natural cooling may be used. Natural cooling is performed by removing the heat source. If desired, the reduced expanded graphite may be maintained in an atmosphere comprising carbon monoxide during cooling. This may help to reduce the incidence of oxide formation.

In some embodiments, reduced expanded graphite prepared in accordance with the process of the invention may be subjected to further treatment to substantially separate the layers of reduced graphene from one another.

In one set of embodiments, the process of the invention may comprise the step of subjecting the reduced expanded graphite to conditions sufficient to exfoliate the reduced expanded graphite. Exfoliation of the reduced expanded graphite produces flakes or sheets of reduced graphene.

The reduced graphene produced after exfoliation may be in the form of multi-layer reduced graphene (i.e. >10 layers thick), few layer reduced graphene (i.e. from 2 to 10 layers thick), monolayer reduced graphene (i.e. 1 layer thick), and mixtures thereof. The process of the invention has been found to be advantageous in producing a substantial quantity of reduced graphene in monolayer form.

In one set of embodiments, the reduced expanded graphite may be subjected to mechanical exfoliation to produce the reduced graphene. Mechanical exfoliation may be achieved using a variety of different techniques. Suitable techniques may apply shear forces to the reduced expanded graphite, thereby generating separated layers of reduced graphene. Examples of some techniques that may be employed are melt blending and cavitation.

In one form of the invention the reduced expanded graphite is subjected to cavitation to separate the layers of reduced graphene. Cavitation may be induced by a number of different means, such as by sonication, jet cavitation, steam cavitation, or the like, or a combination of any one of the aforementioned methods.

In some embodiments the reduced expanded graphite is sonicated. A person skilled in the art would appreciate that sonication involves the application of sound energy to agitate the reduced expanded graphite and ultimately result in disruption of the array of carbon lattice layers forming the expanded graphite material. Disruption of the multi-layer array therefore leads to separation of the layers and the formation of flakes or sheets of reduced graphene. The reduced expanded graphite may be subjected to a sonication at suitable sound frequency sufficient to cause disruption of the multi-layer array of the graphite material.

In one set of embodiments the reduced expanded graphite is ultrasonicated. Conditions useful for exfoliating expanded graphite by sonication may be known to a person skilled in the art. In some embodiments, the reduced expanded graphite may be sonicated at a frequency of at least 20 kHz, preferably at a frequency in the range of from about 20 to 100 kHz.

Exfoliation of the reduced expanded graphite by sonication methods such as ultrasonication may be carried out for time sufficient to produce a desired quantity of reduced graphene. In some embodiments, the reduced expanded graphite may be ultrasonicated for a time period ranging from seconds to hours, depending on the quantity of expanded graphite to be exfoliated, the apparatus used, and the desired result for example. In one set of embodiments, the reduced expanded graphite may be ultrasonicated for a time period in a range selected from the group consisting of from about 1 minute to 60 minutes, from about 5 to 50 minutes, from about 10 to 40 minutes and from about 20-30 minutes. The inventors have found that ultrasonication significantly enhances separation of the graphene layers.

In some embodiments it may be desirable to subject the reduced expanded graphite to sonication (preferably ultrasonication) for a time period of no more than about 60 minutes, preferably no more than about 50 minutes, more preferably no more than about 40 minutes, and most preferably, no more than about 30 minutes. Shorter ultrasonication times may be desirable in some embodiments as prolonged sonication (i.e. for more than 60 minutes) can result in the production of graphene of smaller size or dimensions.

In some embodiments, the reduced expanded graphite is subjected to jet cavitation or steam cavitation.

To assist with exfoliation, the reduced expanded graphite may be dispersed in a carrier and exfoliated in the carrier. The carrier may be a solid or liquid carrier.

In one set of embodiments, the carrier is a liquid carrier, such as a solvent. An exemplary solvent may be an aromatic hydrocarbon solvent, preferably a non-polar aromatic hydrocarbon solvent, such as for example, xylene (preferably p-xylene), benzene, toluene, phenol, o-chlorophenol, and the like.

When the carrier is a solid, melt mixing may be employed to disperse the reduced expanded graphite in the carrier.

In one set of embodiments, the solid carrier may be a polymer, preferably a polymer comprising aromatic hydrocarbon groups. Examples of such polymers are poly(styrene), poly(styrene-butadiene-styrene) (SBS), polycarbonate, poly(ethylene terephthalate), and the like. A skilled person would appreciate that polymers may be heated above their melting temperature ($T_m$) to produce a molten polymer carrier that may be mixed with the reduced expanded graphite.

The dispersion of the reduced expanded graphite in a carrier for exfoliation may be useful as the carrier may help to maintain the separated layers of reduced graphene that are produced in a physically dispersed and separated state. In particular, when the carrier is an aromatic hydrocarbon solvent (preferably a non-polar aromatic hydrocarbon solvent), there is the potential for the reduced graphene sheets to participate in non-covalent pi interactions with the aromatic solvent and in this manner, the graphene sheets in the solvent may be stabilised against agglomeration.

In one set of embodiments the reduced expanded graphite is dispersed in a liquid carrier such a solvent and ultrasonicated in the liquid carrier. The ultrasonication results in exfoliation of the expanded graphite and the production of separated reduced graphene in the liquid carrier. Suitable ultrasonication conditions are described herein.

A solution comprising separated layers of reduced graphene dispersed in a liquid carrier may be used directly, without the need to isolate the graphene from the liquid carrier. For instance, the solution may be combined with a polymer to form a composite comprising the reduced graphene.

In another aspect, the present invention also provides reduced graphene prepared by a process of any one of the embodiments described herein.

Reduced graphene produced by the process of the invention may be in sheet or flake form. In some embodiments the reduced graphene is in the form of a two-dimensional planar flake. The reduced graphene may be of any size. In some embodiments, reduced graphene produced by the process of the invention may have a particle size in the range of from about 1 to 100 μm and may in some embodiments, have a particle size in the range of from about 2 to 60 μm. Reduced graphene in flake form may desirably be used as a strengthening agent in reinforcing applications.

Reduced graphene prepared by the process of the invention may be regarded as high quality graphene as it contains fewer oxygen containing groups and may also contain fewer defects than graphene produced by processes of the prior art. The physical and structural characteristics of reduced graphene produced by the process of the invention may be assessed using conventional techniques. For example, the occurrence of oxygen containing groups may be assessed by techniques such as thermogravimetric analysis (TGA) while defects may be identified using Raman spectroscopy. The inventors have found that the process of the invention is able to produce graphene with very few oxide groups and low defects.

It is one advantage of the process of the invention that high quality reduced graphene can be produced in monolayer form. Monolayer (i.e. single layer) graphene may be indicated by a single 2D peak at approximately 2650 $cm^{-1}$ when the graphene is characterised by Raman spectroscopy. The 2D peak is strongly influenced by strain, intercalants and charged impurities. The presence of a single, clear 2D peak is indicative of monolayer graphene. A G band in Raman spectroscopy has also been shown to correlate with the number of layers in graphene. Single layers are indicated by an increase in Raman shift while double layers or multiple layers (e.g. graphite) are indicated by a decrease in Raman shift. The inventors have found that reduced graphene produced in accordance with the invention display a significant G band in the Raman spectra at approximately 1580 $cm^{-1}$, which is also indicative of the graphene being in single layer form.

A further advantage of the process of the invention is that graphene can be prepared with few defects. Defects in graphene may be identified by the presence of a D band in the Raman spectra at approximately 1310 $cm^{-1}$. The intensity of the D band is believed to be proportional to the number of defects, with a low intensity D band indicating few defects being present.

Reduced graphene produced in accordance with embodiments of the process of the invention may also be characterised by a D/G ratio. The D/G ratio can be defined as the ratio of the peak Raman D band to the peak Raman G band intensity. The D/G ratio may provide a useful indication of whether the graphene produced is high quality graphene. A high D/G ratio (e.g. a ratio of 1 or greater) can indicate the presence of more defects and a lower quality graphene, while a low D/G ratio (e.g. a ratio of less than 1) may be indicative of graphene with fewer defects and thus higher quality. It is one advantage of the process of the invention that reduced graphene exhibiting a low D/G ratio can be prepared. In one set of embodiments, reduced graphene produced in accordance with the invention may have a D/G ratio of no more than about 0.6, preferably a D/G ratio of no more than about 0.5, more preferably a D/G ratio of no more than about 0.45, when calculated as a ratio of D:G peak intensities as determined by Raman spectroscopy.

It is one advantage that the process of the invention is able to provide a facile method of producing large quantities of high quality graphene from relatively inexpensive and readily available starting materials. The process of the invention is furthermore relatively simple and low cost, compared to other methods for forming graphene described in the prior art. The process of the invention is also scalable and has the potential to be scaled up to produce commercially viable quantities of graphene.

Reduced graphene produced by the process of the invention may be useful in applications where high quality graphene is desired. These applications include without limitation, flexible electronics, advanced materials, semiconductors, electrodes, conductive thin films, solar cells, reinforced materials, and the like for example. As the process of the invention is capable of producing graphene with few defects, the electrical, thermal, mechanical and/or optical properties of materials and articles incorporating the graphene can also be improved.

The most common way to disperse graphene in a polymer involves functionalising the graphene, with the inevitable creation of defects, to enhance dispersion and interaction with the polymer. We have found that the graphene in accordance with the invention exhibits improved dispersion particularly through π-π interactions particularly with aromatic monomer units in a polymer. In a further set of embodiments there is thus provided a polymer composition comprising a polymer material preferably comprising an aromatic monomer unit such as a styrene polymer such as polystyrene or copolymer of styrene such poly(styrene-butadiene-styrene) (SBS); and graphene as herein described in an amount in the range of from 0.2% to 30% by weight, such as 1% to 20%, preferably from 1% to 25%, more preferably from 5% to 20% based on the weight of the polymer.

We have found that adding the graphene to SBS decreased stress by up to 72% at a 20% loading. Youngs modulus (a measure of stiffness), is increased as graphene loading increased. SBS-graphene composites were found to have decreased strain by 94% at a 20% loading compared with SBS. The graphene may be added using melt or solvent based dispersion using, for example, an aromatic solvent such as those described above.

The invention will now be described with reference to the following examples. It is to be understood that the examples are provided by way of illustration of the invention and that they are in no way limiting to the scope of the invention.

EXAMPLES

Example 1

General Characterisation Methods

Electron microscopies were used to characterise surface morphology. For the Philips XL30 Scanning Electron Microscope (SEM) graphene was mounted on conductive carbon tape and high vacuum mode was used (~1.2×10$^{-5}$ mBar).

For the Jeol 1010 Transmission Electron Microscope (TEM) Graphene 4 mg was suspended in 3 mL N-methyl-2-pyrrolidone (NMP) and further dispersed with 10 min of ultrasonication. A drop of suspended graphene was placed on GYCU200 Holey support film (200 mesh copper grids). The solvent was left to evaporate for 1 h before imaging.

Raman spectroscopy was used to measure inelastic scattering in the graphene. A Perkin-Elmer Raman Station 400F 785 nm (Near Infra Red) 250 mW and spot size 100 µm was used. 120 scans of 1 s were carried out. The graphenes were compressed in a press (9 t for 5 min) to obtain a stronger response.

Thermogravimetry was performed using a Perkin-Elmer TGA-7. A ~2 mg mass of graphene was analysed in an open platinum pan. The sample was heated from 30-1000° C. at 20° C./min in nitrogen at 20 mL/m in. At 950° C. the gas was switched back to air at 20 mL/min and held for 10 min. After 9 min the gas was switched back to $N_2$.

Conductivity testing (DC measurement) was carried out with a HP 4192A 5 Hz-13 MHz LF impedance analyser and clamp with two 1.2 cm diameter circular electrodes.

Preparation of Reduced Graphene

Expandable graphite (in 1 g amounts) was expanded for 30 s in a muffle furnace preheated to a selected temperature to create an expanded graphite. The expanded graphite (0.3 g) was then heated in a ceramic tube furnace at various times and temperatures in a reducing atmosphere containing carbon monoxide.

After carbon monoxide treatment, the reduced expanded graphite (0.01 g) was then ultrasonicated in p-xylene (2 mL). Ultrasonication was carried out (frequency 20 kHz and amplitude 25%) using a Sonics Autotune series high intensity Ultrasonic Processor Model: GEX 500 (power 500 W). Ultrasonication was continued until no more large (unexfoliated) particles of graphene were visible (approximately 20 minutes).

Reduced graphene was prepared in accordance with the above procedure under the various process conditions shown in Table 1.

TABLE 1

Reduced graphene prepared using various process conditions

| | | Expansion | | | CO Reduction | | |
|---|---|---|---|---|---|---|---|
| Example | Material | Temp (° C.) | Time (s) | Temp (° C.) | Time (h) | Gas | Gas Flow rate (mL/min) |
| 1 | Graftech 220-50N | 1000 | 30 | 800 | 8 | 100% CO | 150 |
| 2 | Graftech 220-50N | 1100 | 30 | 800 | 8 | 10% CO | 150 |

Vibrational Spectroscopy

Raman spectroscopy is the most common way of characterising graphenes; it records vibrations of covalent bonds in molecules. It is sensitive to changes in polarisability (stretching and deformation) rather than dipole moment. It is most sensitive to symmetrical bonds and slight changes in bond angle or strength. Thus it is particularly sensitive to changes in the $sp^2$ symmetry of graphenes.

Figure 1:
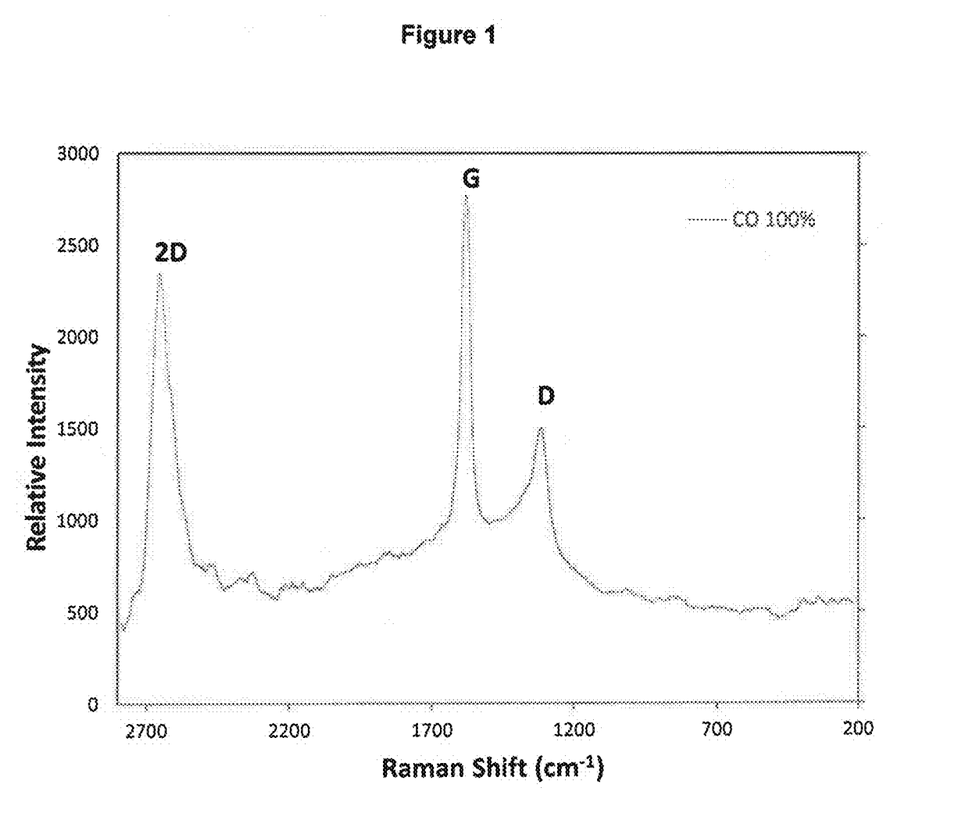
FIG. 1 is a Raman spectrum showing significant peaks at ~2650, ~1580 and ~1314 $cm^{-1}$ (2D, G and D bands) for a reduced graphene produced in accordance with embodiments of the invention described in Example 1.

The Raman spectra of the graphene produced in Example 1 is shown in FIG. 1. Significant peaks were observed at ~2650, ~1580 and ~1314 $cm^{-1}$ (2D, G and D bands) in the Raman spectra.

2D Peak

The 2D peak (second order of the D peak) is strongly influenced by strain, intercalants and charged impurities. Single layer graphene is indicated by a single 2D peak. The graphene produced in Example 1 showed a clear single layer 2D peak at 2654 $cm^{-1}$ indicating single layer graphene.

D Peak

The D peak occurs when there are defects in the graphene matrix. The graphene produced in Example 1 showed small D peaks, indicating relatively few defects present.

G Peak

The Raman G band has been shown to correlate with the number of layers in graphene. Single layers are indicated by an increase in Raman shift. Double or multiple layers (graphite) are indicated by a decrease in Raman shift. The graphene produced in Example 1 showed peaks between 1580-1582 $cm^{-1}$, and compares favourably with a commercial source of graphene (Cheap Tubes graphene) which is single layer.

D/G Ratio

The D/G ratio is an alternative measure of defects which is often more useful than the D peak alone: A high D/G ratio indicates more defects while a lower D/G ratio indicates fewer defects. A D/G ratio may be determined using two methods: (1) by determining the ratio of D to G peak intensities, or (2) by determining the ratio of the area under the curve of the D and G peaks.

Using method (1), the reduced graphene produced in Example 1 had a low D/G ratio at 0.41, indicating the presence of few defects. Using method (2), the carbon monoxide reduced graphene had a D/G ratio of 0.64.

Area under the curve calculations were also used to calculate a 2D/G ratio. The 2D/G ratio was determined to be 3.08.

Thermogravimetric Analysis

Thermogravimetric analysis (TGA) has been used to compare graphenes. Oxide groups (hydroxides, epoxides, carboxylic acids and ketones) on graphene are less thermally stable than a fully aromatic structure. Such functional groups on graphene disrupt the graphene $sp^2$ bonding and introduce $sp^3$ bonds. These functional groups are responsible for defects on the graphene. Heating in a reducing (CO) atmosphere removes these oxide groups. The mass loss can be used to provide a measure of oxide groups remaining on the surface of graphene after treatment with CO. Measuring the oxides is also a method to establish the number of defects.

The TGA results show that CO reduced graphene produced in Example 1 had a mass loss of about 0.4%. This means that the CO reduced graphene had few oxide groups on its surface. The CO was shown to be a strong reducing agent and has the greatest ability to remove oxide groups. As graphene quality improves when oxide groups are removed (less defects) TGA is a relatively simple yet useful graphene characterisation technique.

Conductivity

Graphene is normally conductive making conductivity a potential method of characterisation. DC resistance measurements were carried out on compressed disks formed with graphene reduced with CO.

Graphene resistivity was carried out for reduced graphenes prior to ultrasonication. Graphene treated in a reducing atmosphere of CO exhibited a resistivity of 238 Ω·cm. Oxidised graphene is less conductive so any processing to remove oxide groups decreases resistance. By this measure the CO reduction method was successful at removing oxide groups.

Particle Size

The reduced graphene produced in Example 1 was analysed with a Canty particle sizing system. A sample of graphene in N-methyl pyrrolidone (NMP) was diluted by addition to 250 mL of isopropyl alcohol. 0.75 to 1.0 mL of the diluted solution was then used per particle size test. The graphene particles were determined to have sizes ranged from about 7 to 46 microns, with an average particle size of about 17 microns.

Contact Angle Measurements

The reduced graphene produced in Example 1 also exhibited a contact angle of about 107 degrees (surface energy of 19.10 mN/m). This could be indicative of the presence of only relative small amounts of oxide groups, resulting in a more hydrophobic graphene material.

A Comparative graphene sample produced by thermal expansion of graphite at 1000° C. for 30 seconds and without treatment with carbon monoxide exhibited a contact angle of about 81 degrees (surface energy of 34.65 mN/m).

Preparation of Reduced Graphene in a Single Step Process

Expandable graphite (0.33 g) was heated in a tube furnace containing a carbon monoxide (CO) atmosphere at a selected temperature to expand the graphite. The expanded graphite was then maintained at a selected temperature in the CO atmosphere for a further period of time. The heat was then removed and the expanded graphite left to cool naturally to room temperature in the CO atmosphere.

If the carbon monoxide treatment step was carried out at a different temperature than the expansion step, the expanded graphite remained in the furnace as the temperature in the furnace was adjusted to the temperature desired for the carbon monoxide treatment. The various process conditions tested for the single step procedure are shown in Table 2.

TABLE 2

Single step production of graphene under various process conditions

| | | Expansion | | CO Reduction | | | Gas Flow |
|---|---|---|---|---|---|---|---|
| Example | Material | Temp (° C.) | Time (s) | Temp (° C.) | Time (h) | Gas | Rate (mL/min) |
| 3 | Graftech 220-50N | 1100 | 30 | 1100 | 8 | 10% CO | 150 |
| 4 | Graftech 220-50N | 1000 | 30 | 1000 | 8 | 10% CO | 150 |
| 5 | Graftech 220-50N | 900 | 30 | 900 | 8 | 10% CO | 150 |
| 6 | Graftech 220-50N | 800 | 30 | 800 | 8 | 10% CO | 150 |
| 7 | Graftech 220-50N | 700 | 30 | 700 | 8 | 10% CO | 150 |
| 8 | Graftech 220-50N | 600 | 30 | 600 | 8 | 10% CO | 150 |
| 9 | Graftech 220-50N | 500 | 30 | 500 | 8 | 10% CO | 150 |
| 10 | Graftech 220-50N | 400 | 30 | 400 | 8 | 10% CO | 150 |
| 11 | Graftech 220-50N | 300 | 30 | 300 | 8 | 10% CO | 150 |
| 12 | Graftech 220-50N | 220 | 30 | 220 | 8 | 10% CO | 150 |
| 13 | Graftech 160-80N | 160 | 30 | 160 | 8 | 10% CO | 150 |
| 14 | 220-50N | 1100 | 30* | 800 | 8 | 10% CO | 150 |
| 15 | 220-50N | 1100 | 30* | 700 | 8 | 10% CO | 150 |
| 16 | 220-50N | 1100 | 30* | 600 | 8 | 10% CO | 150 |
| 17 | 220-50N | 1100 | 30* | 500 | 8 | 10% CO | 150 |
| 18 | 220-50N | 1100 | 30* | 400 | 8 | 10% CO | 150 |
| 19 | 220-50N | 1100 | 30* | 300 | 8 | 10% CO | 150 |
| 20 | 220-50N | 1100 | 30* | 200 | 8 | 10% CO | 150 |
| 21 | 220-50N | 1100 | 30* | 150 | 8 | 10% CO | 150 |
| 22 | 220-50N | 1100 | 30* | 800 | 8 | 10% CO | 150 |
| 23 | 220-50N | 1100 | 30* | 800 | 8 | 10% CO | 75 |
| 24 | 220-50N | 1100 | 30* | 800 | 8 | 10% CO | 300 |
| 25 | 220-50N | 1100 | 30* | 800 | 1 | 10% CO | 150 |
| 26 | 220-50N | 1100 | 30* | 800 | 4 | 10% CO | 150 |
| 27 | 220-50N | 1100 | 30* | 800 | 8 | 10% CO | 150 |
| 28 | 220-50N | 1100 | 30* | 800 | 12 | 10% CO | 150 |
| 29 | 220-50N | 1100 | 30* | 800 | 16 | 10% CO | 150 |

*The furnace was heated to 1100 C. with a 30 minute window to insert the expandable graphite. The expansion was thus carried out over about 30 s but the sample remained at 1100 C. until the temperature dropped to the CO reduction temperature.

Examples 3-13 illustrate a single process in which graphite expansion and CO treatment are performed at the same temperature.

Examples 14-21 illustrate a single step process in which graphite expansion is carried out a first temperature of 1100° C. and treatment with CO is performed at various temperatures.

Examples 22-24 illustrate a single step process in which graphite expansion is carried out a first temperature of 1100° C. and treatment with CO is performed at 800° C. with various gas flow rates.

Examples 25-29 illustrate a single step process in which graphite expansion is carried out a first temperature of 1100° C. and treatment with CO is performed at 800° C. for various time periods.

Figure 2:
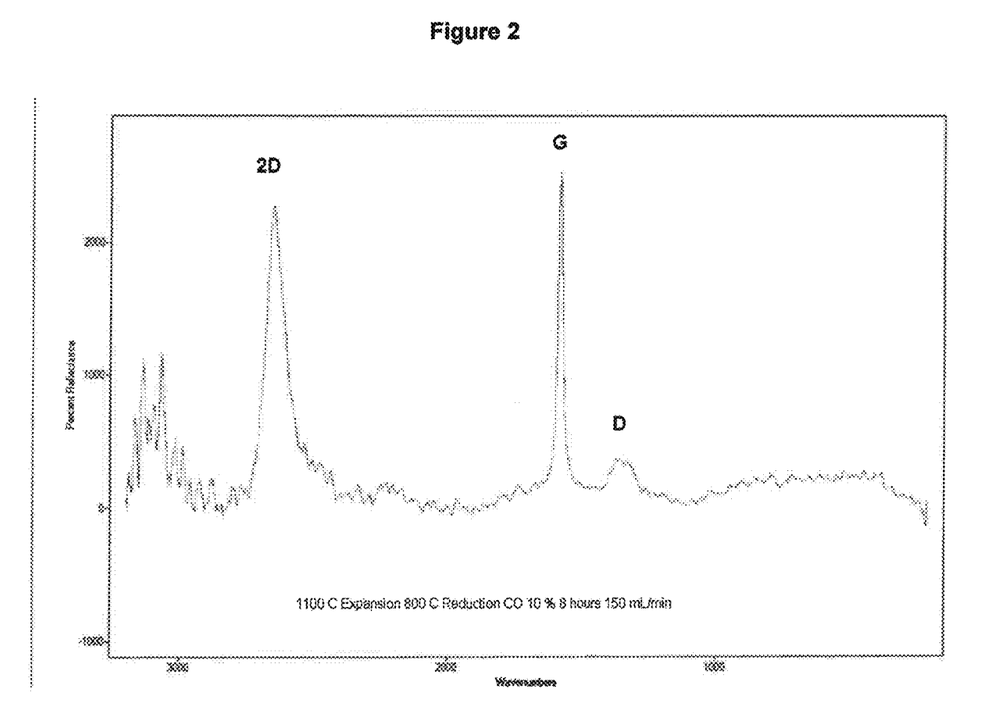
FIG. 2 is a Raman spectrum showing significant peaks at ~2650, ~1580 and ~1314 $cm^{-1}$ (2D, G and D bands) for a reduced graphene produced in a single vessel in accordance with embodiments of the invention described in Example 1.

The Raman spectra of the graphene produced in the single step process of Example 14 is shown in FIG. 2. The spectra showed significant peaks at ~2650, ~1580 and ~1314 cm$^{-1}$ corresponding to 2D, G and D bands.

Example 2

This Example demonstrates dispersion and reinforcement of SBS with up to 20% w/w graphene using π-interactions to maintain the sp$^2$ structure of a low defect graphene.

Materials

Graphtech (GT) 220-50N expandable graphite. HDPlas (Cheap Tubes) (CT)>700 m$^2$/g nano platelets (grade 4) 1-2 μm diameter <3 nm 1-3 layers; poly(styrene-b-butadiene-b-styrene) (SBS) from Aldrich CAS 9003-55-8; benzene and N-methylpyrrolidone (NMP) from Merck;

Preparation

GT (in 1 g amounts) was expanded in air for 30 s in a furnace preheated to 1000° C. The GT was heated in a ceramic tube furnace at 1000° C. for 8 h in a reducing atmosphere of CO 10%) (GT-CO).

Disks of 2 cm diameter (~0.5 mm thick) were formed from expanded GT by applying a 9 t load for 5 min in a hydraulic press.

Graphene prepared according to claim 1 (GT-CO) 1-20% w/w was ultrasonicated in benzene (2 mL) for 10-20 min. Ultrasonication (20 kHz and amplitude 25%) was continued until no more large (un-exfoliated) particles of graphene were visible. A Sonics Autotune series high intensity Ultrasonic Processor Model: GEX 500 (power 500 W) was used.

SBS (1 g) was dissolved in benzene (10 mL) by standing overnight at 23° C. SBS and graphene solutions were combined and ultrasonicated (to disperse graphene).

Composites were precipitated with methanol, dried and consolidated in a heated press at 155° C. and 6 t pressure. A small round mould of ~4.2 mm diameter and 0.5 mm thickness was used. Polytetrafluoroethylene (PTFE) sheets were placed on both sides and sandwiched between metal plates. The mould was ~30% overfilled to force out any bubbles and holes.

Characterisation

Raman spectroscopy was used to measure inelastic scattering in the graphene. A Perkin-Elmer Raman Station 400F 785 nm 250 mW and spot size 100 µm was used. Raman spectra were recorded with 120 of 1 s were carried out for compressed GT. Graphenes were compressed in a press (9 t for 5 min) to obtain a more intense response with the exception of CT, which was not compressed. Uncompressed CT required 30 scans of 1 s.

Thermogravimetry was employed to determine thermal stability using a Perkin-Elmer Pyris 1 TGA. The sample was left for 12-24 h in flowing nitrogen to remove adsorbed oxygen. Prior to each experiment the pan was cleaned in nitric acid (>1 h at 75° C.). The nitric acid was neutralised with sodium bicarbonate and flushed with water. A thermal cleaning cycle was performed: heating in air at 40° C./min from 50-850° C. and held for 10 min. A ~2 mg mass of graphene was analysed in an open platinum pan. The sample was heated from 30-1000° C. at 20 K/min in nitrogen at 20 mL/min. At 950° C. the gas was switched to air at 20 mL/min and held for 10 min.

Electron microscopy was used to characterise surface morphology. Using a JEOL 2100 TEM, thermally expanded GT-CO 4 mg was suspended in 1 mL N-methylpyrrolidone (NMP) and dispersed for 10 min ultrasonication. 10 µL was taken and placed in 1 mL of NMP for dilution. A drop of the suspended graphene was placed on a GYCU200 Holey support film (200 mesh copper grid). The solvent was left to evaporate. Cryo-ultramicrotomy was used to prepare SBS specimens. A Leica Ultracut UCT with a cryo-stage (liquid nitrogen) and diamond knife was used to create 60-120 nm sections at −130° C.

Stress-strain tensile mechanical analysis (TMA) was used to measure stress-strain curves. Measurement was carried out with a TA Instruments DMA Q800 at room temperature (25° C.) and a ramped force to 11 N. A hysteresis curve was formed by returning the force to zero.

Results and Discussion

SBS was dissolved and graphene dispersed using benzene, a solvent chosen for its potential π-electron interactions with the poly-cyclic aromatic graphene structures. This solvent was found to assist suspension and dispersion of the graphenes, while ultrasonication was found to increase graphene interlayer exfoliation. Rapid precipitation of the composite into methanol prevented graphene agglomeration.

Thermal Stability—

TGA determination of content of oxygen containing groups.

Thermogravimetry (TGA) was used to measure thermal stability. Oxygen containing groups (—OH, —O—, —COOH and =O) on graphene have low thermal stability. Heating in an inert nitrogen ($N_2$) environment removes these oxide groups. Thus mass loss in a TGA can be used to measure the oxide groups on the surface of graphene.

Figure 3:
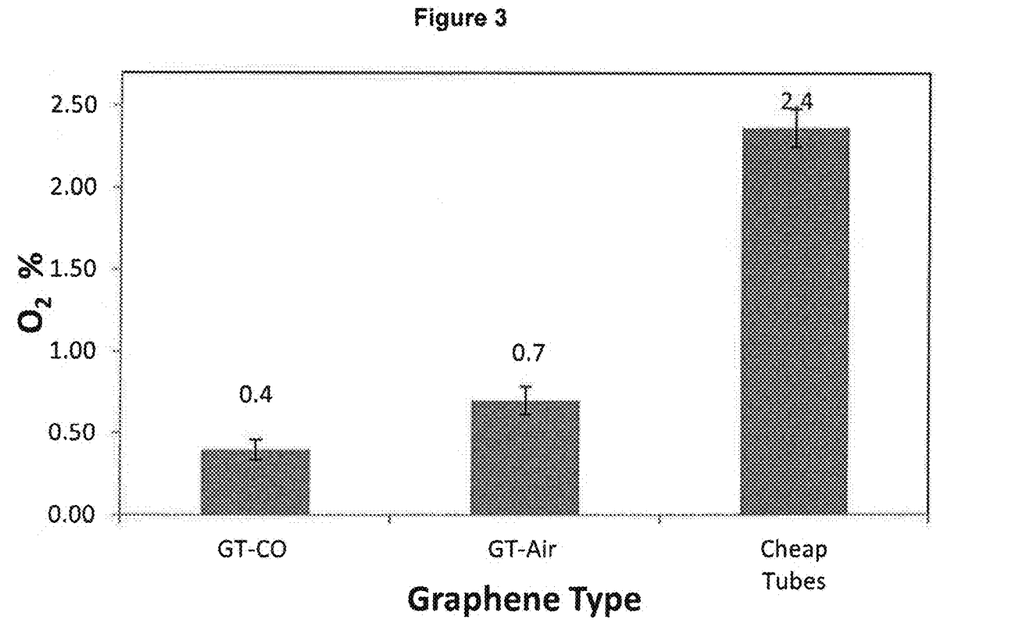
FIG. 3 is a bar chart comparing the oxide content for graphene prepared in accordance with the invention "GT-CO" with comparison graphene types in accordance with the properties described in Example 2.

TGA measured oxide levels as 2.4% for CT, 0.7% for GT-Air and 0.4%, for GT-CO (FIG. 3). The GT-CO had 84% less oxides than the commercial graphene (CT). Low oxide content indicates a low defect graphene.

Microscopy

Electron microscopy was used to characterise graphenes and poly(styrene-b-butadiene-b-styrene)-graphene composites. It was used to confirm the quality of the graphene and reveal detail about the structure of SBS-graphene composites.

Transmission electron microscopy (TEM) was required to resolve individual graphene layers. Individual graphene layers are often difficult to distinguish in a polymer. Graphenes usually cannot be distinguished if oriented edgewise in a specimen. Graphene without any supporting polymer is difficult to resolve as it requires a supporting medium and it tends to agglomerate. Agglomeration is minimised with sufficient dilution in an appropriate liquid with subsequent rapid evaporation.

Graphene images were collected at high resolution in SBS and after dispersing graphene in a solvent with ultrasonication. Both images showed that GT-CO graphene had a tendency to form scrolls although this was not a dominant feature. Both images show single layers of graphene The TEM images show that single layer graphene existed before dispersion in SBS and that the single layers did not agglomerate after dispersion in the SBS. This shows π-interactions were sufficient at aiding dispersion.

Mechanical Properties

Figure 4:
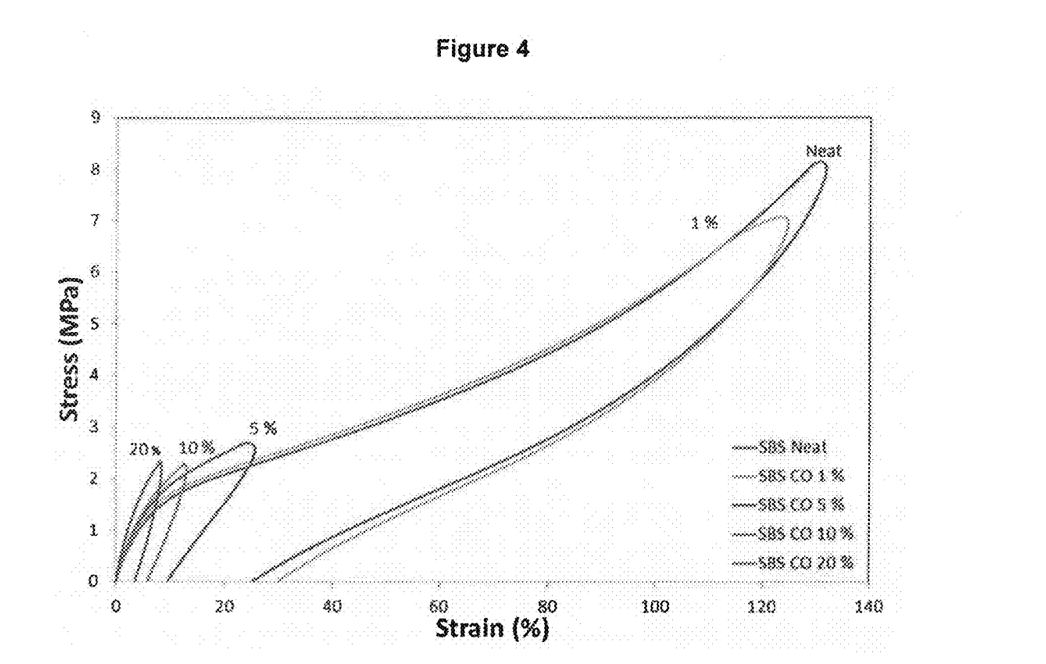
FIG. 4 shows a number of plots on a graph of hysteresis curves plotting the variation in stress-strain as stress is increased and then decreased for SBS compositions containing 0%, 1%, 5%, 10% and 20% graphene in accordance with the invention in accordance with the properties described in Example 2.

Stress-strain tensile mechanical analysis (TMA) was used for characterizing and comparing the mechanical performance of SBS and the graphene nanocomposites. Enhancements in performance were detected, measured and graphically represented. TMA was used to measure stress-strain as a stress was increased and then decreased forming a hysteresis curve (FIG. 4). A hysteresis curve provides extra information about the reversible performance of the materials.

Figure 5:
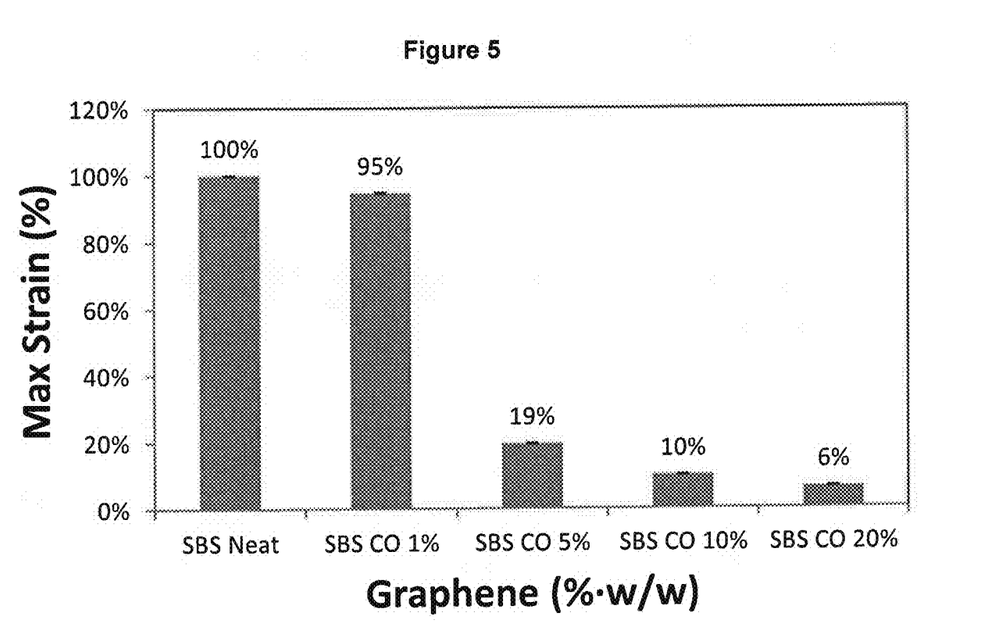
FIG. 5 is a bar chart showing the maximum strain of SBS compositions with 0%, 1%, 5%, 10% and 20% graphene prepared in accordance with the invention in accordance with the properties described in Example 2.
Figure 6:
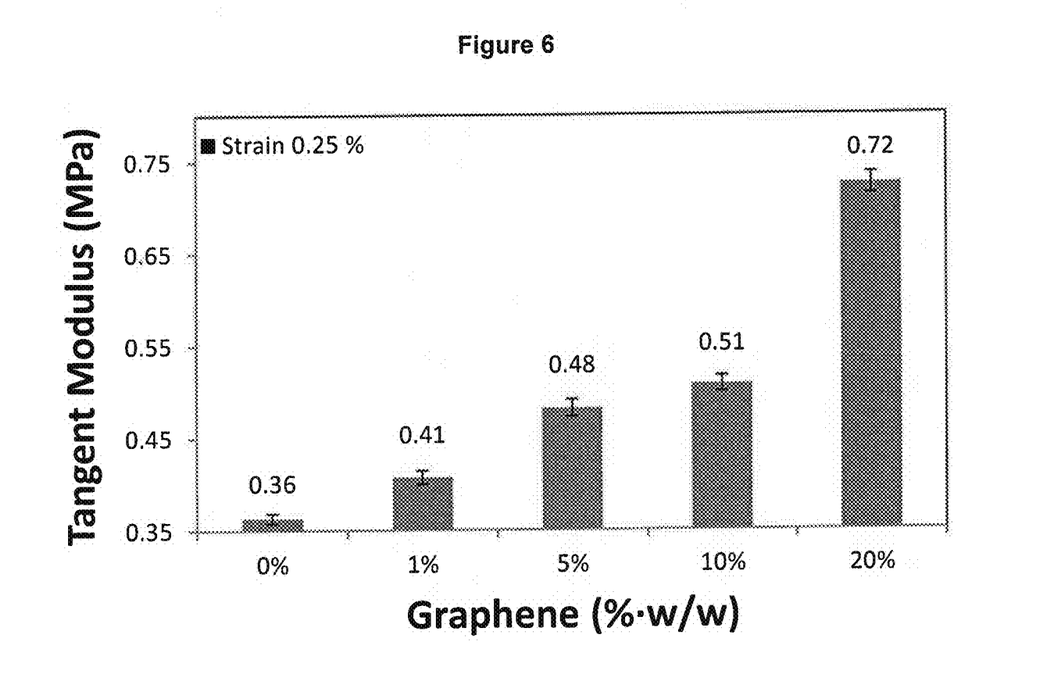
FIG. 6 is a bar chart showing the tangent modulus of SBS compositions at 2.5% strain containing 0%, 1%, 5%, 10% and 20% graphene in accordance with the invention in accordance with the properties described in Example 2.

Adding GT-CO graphene to SBS decreased max strain by up to 94% at a 20% w/w loading (FIG. 5). Tangent modulus (a measurement at single point) was used because the line was curved (no linear region). It was measured from the initial region of the stress-strain curve (0.25% strain) to avoid changes in cross sectional area and length. The results show that at a strain of 0.25% tangent modulus increased by up to 100% (0.72 MPa) when graphene loading was 20% w/w (FIG. 6).

These results demonstrate that the performance of SBS-graphene composites continue to increase as the loading increases to 20% w/w. This shows that π-interactions were successful at continuing to disperse graphenes even at higher loadings.

Raman spectra showed strong, 2D peaks for GT-CO graphene and a low D/G ratio of 0.41 (low defects). TGA results showed low oxide levels of 0.41% (low defects). TEM microscopy confirmed that GT-CO was well dispersed in SBS and exfoliated into single layer graphenes both before and after incorporation into SBS. No defects were visible. TMA demonstrated improved performance at room temperature with strain improving by up to 94% and tangent modulus improving by 100% at 20% w/w GT-CO.

Low defect graphene (GT-CO) is of particular interest to explore and extend the unique properties of graphene. High defect graphenes and low defect graphenes behave differently. Possible uses might include nanocomposites, electronics (capacitors) and filtration (gases or water).

Pi-interactions capable of dispersing graphenes up to a loading of 20% w/w provide an advantageous route to the dispersion of graphenes in aromatic liquids, polymers and related products.

Low defect graphene prepared by carbon monoxide reduction of a thermally expanded graphene was combined with SBS to create composites. The loading of the GT-CO was varied from 0 20 20% w/w with π-interactions to preserve the sp² matrix of the graphene. The effectiveness of the dispersion was demonstrated by the performance of the SBS that was positively affected by the GT-CO: tangent modulus increased and strain decreased. The uniform dispersion of graphene in SBS was verified using TEM. Lower oxide content of the graphene was verified by TGA. Creation and dispersion of graphene with low defects is noteworthy. Thermal expansion in a reducing carbon monoxide atmosphere is an efficient and effective means to produce high quality graphene, that is solution or melt dispersible in thermoplastics such as SBS.

It is to be understood that various other modifications and/or alterations may be made without departing from the spirit of the present invention as outlined herein Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Future patent applications may be filed on the basis of, or claiming priority from, the present application. It is to be understood that the following provisional claims are provided by way of example only, and are not intended to limit the scope of what may be claimed in any such future application. Features may be added to or omitted from the provisional claims at a later date so as to further define or re-define the invention or inventions.

The invention claimed is:

1. A process for the preparation of single-layer graphene comprising the sequential steps of:
    providing an expandable graphite intercalated with oxygen containing groups;
    heating the expandable graphite under conditions sufficient to cause expansion of the expandable graphite and formation of an expanded graphite comprising oxygen containing groups;
    contacting the expanded graphite with carbon monoxide and at a temperature of 500° C. to 1200° C. for a period of time of at least 30 minutes and sufficient to reduce the content of oxygen containing groups in the expanded graphite to no more than about 1% by weight of the resulting reduced expanded graphite comprising an array of reduced graphene; and
    subjecting the reduced expanded graphite to mechanical exfoliation to thereby produce single layers of the reduced graphene.

2. A process according to claim 1, wherein the expandable graphite is heated at a temperature of between 500° C. to 1000° C. during said contacting.

3. A process according to claim 1, wherein the expandable graphite is contacted with a gas comprising 100% carbon monoxide or carbon monoxide in nitrogen.

4. A process according to claim 1, wherein the expandable graphite intercalated with oxygen containing groups is heated for a time period in the range of from about 0.1 seconds to 2 minutes.

5. A process according to claim 1, wherein the expandable graphite intercalated with oxygen containing groups is heated under reduced pressure.

6. A process according to claim 1, wherein heating of the expandable graphite intercalated with oxygen containing groups is carried out in the presence of carbon monoxide, whereby the expansion of the expandable graphite and the reduction of at least a portion of the oxygen containing groups by the carbon monoxide to form the reduced expanded graphite occurs in a single vessel.

7. A process according to claim 1, wherein the reduced graphene has a ratio of D peak to G band (D/G ratio) when determined by Raman spectroscopy of no more than about 0.6, when calculated as a ratio of peak intensities.

8. A process according to claim 1, wherein the quantity of oxygen-containing groups present in the reduced expanded graphite is no more than about 0.5% by weight.

9. A process according to claim 1 wherein the contacting the expanded graphite with carbon monoxide is carried out for between 1 and 24 hours.

10. A process according to claim 1 wherein the expanded graphite is heated at a temperature of 700° C. to 900° C. during said contacting with carbon monoxide.

11. A process according to claim 1 wherein the contacting the expanded graphite with carbon monoxide is carried out for between 6 and 12 hours.

12. A process according to claim 1 wherein the contacting the expanded graphite with carbon monoxide is carried out at a temperature of 500° C. to 1000° C. for a time of 1 to 24 hours.

13. A process according to claim 12 wherein the contacting the expanded graphite in the presence of carbon monoxide is carried out for a time of 6 to 12 hours.

14. A process for the preparation of single-layer graphene comprising the sequential steps of:
    providing an expandable graphite intercalated with oxygen containing groups;
    heating the expandable graphite in the presence of carbon monoxide under conditions sufficient to cause expansion of the expandable graphite and formation of an expanded graphite;
    heating the expanded graphite in the presence of carbon monoxide and at a temperature of 500° C. to 1200° C. for a period of time of at least 30 minutes and sufficient to reduce the content of oxygen containing groups in the expanded graphite to no more than about 1% by weight of the resulting reduced expanded graphite comprising an array of reduced graphene; and
    subjecting the reduced expanded graphite to mechanical exfoliation to thereby produce single layers of the reduced graphene.

15. A process according to claim 14, wherein the reduced expanded graphite is sonicated.

16. A process according to claim 15, wherein the reduced expanded graphite is sonicated at a frequency of at least 20 kHz.

17. A process according to claim 14, wherein the reduced expanded graphite is dispersed in a solvent and exfoliated in the solvent.

18. A process according to claim 17, wherein the solvent is an aromatic hydrocarbon solvent.

19. A process according to claim 14, wherein the quantity of oxygen-containing groups present in the reduced expanded graphite is no more than about 0.5% by weight.

* * * * *